Oct. 20, 1970    R. B. HOOK ETAL    3,534,603
COVER FOR METER REGISTER
Filed Dec. 14, 1967
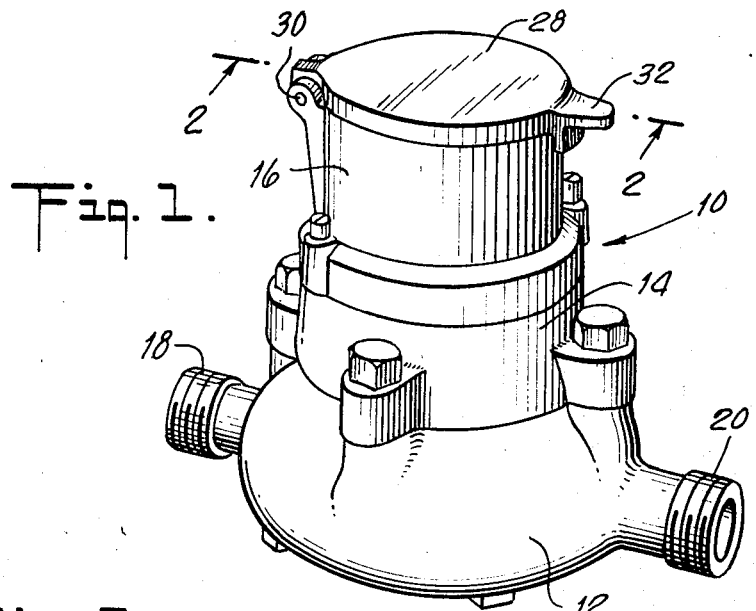
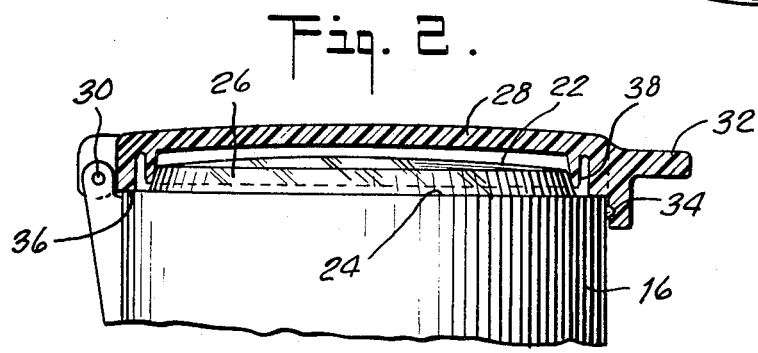
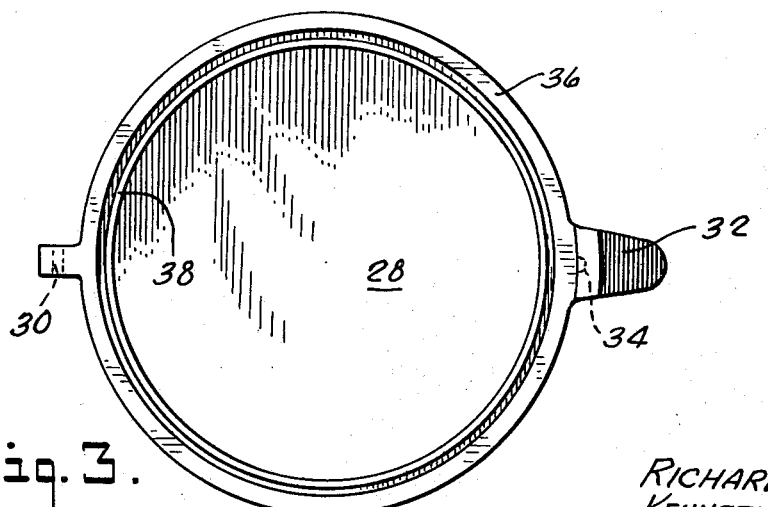
INVENTORS
RICHARD B. HOOK
BY KENNETH SOUTHALL
ATTORNEY

3,534,603
COVER FOR METER REGISTER

Richard B. Hook, Franklin Lakes, N.J., and Kenneth Southall, Wethersfield, Conn., assignors to Neptune Meter Company, New York, N.Y., a corporation of New Jersey
Filed Dec. 14, 1967, Ser. No. 690,632
Int. Cl. G01f *15/14*
U.S. Cl. 73—273                                 1 Claim

ABSTRACT OF THE DISCLOSURE

The crystal closure and register box cover of a meter coact to form a water and dirt tight closure for the former. The peripheral edge of a crystal disk which extends upwardly from the register box is tapered inwardly toward its axis, and a hinged cover has a flexible circular internal flange which engages the tapered wall of the crystal, the flange being stressed into tight contact with the latter as the cover is closed and latched.

---

Water meters are sometimes installed at locations in which they are subject to an environment so polluted that the crystal covering the register mechanism becomes so soiled as to make reading of the register very difficult or, indeed, even impossible. This difficulty may be particularly marked in the case of meter installations in outdoor pits where the meter is subject to periodic flooding of dirt-laden water during rainstorms and the like.

It is, therefore, the object of this invention to provide a seal for the meter crystal which will protect it from its surrounding environment, and keep it clean for an indefinite period of time so that the meter may be read without the need to first clean the crystal.

It is an object of the invention to provide a meter crystal seal which will be effective to achieve its purpose and which at the same time is simple in structure and will add nothing to the cost of the meter.

Meter crystals have heretofore been provided with covers. These prior structures have, however, been less than satisfactory because they made closing contact only with the upper lip of the register box with which a perfect contact is difficult to establish.

The present improvement effectively seals and protects the meter crystal by reason of direct contact between the register box cover and the underlying crystal. An effective seal between the two is established because of coaction between a tapered crystal edge and an annular flexible flange on the inner face of the cover. The flexibility of the flange permits it to conform to the tapered surface of the crystal to form a water-tight and dirt-proof seal for the crystal.

The full nature of the invention will be apparent in its details upon reading the following description in light of the drawing forming a part of this application. In the drawing, like reference numerals indicate like parts, and:

FIG. 1 is a perspective view of a water meter in which the improvement is embodied;

FIG. 2 is a view, partly in section and partly in full line, taken on line 2—2 of FIG. 1; and FIG. 3 is a plan view of the cover structure, looking from the bottom face thereof.

In FIG. 1 the improvement herein is embodied in a water meter 10 which includes an outer case consisting of a lower half 12, an upper half 14 and a register box 16. The lower half of the case has screw-threaded inlet and outlet connections 18 and 20 by which the meter may be connected into the water service system. The type or construction of the meter to which the improvement is applied is of no importance so long as it has a register crystal subject to protection.

In FIG. 2 it is seen that the open upper end of the register box 16 has seated therein a register crystal disk 22 which is of suitable transparent material through which the meter register can be read. The crystal 22 extends upwardly beyond the lip 24 at the upper end of the register box, and the exposed peripheral edge 26 is inwardly tapered toward the axis of the crystal disk. The tapered edge 26, in effect, comprises a stressing or camming surface for a coacting cover element as to be pointed out.

A cover 28 is hinged to the register box at a hinge structure 30 about which the cover may be rotated into and out of open and closed position. A hand lug 32 facilitates opening and closure of the cover, and a latch structure 34 will secure it in its closed position.

The cover is in the form of an inverted dish or cup, the outer lip 36 of which is in contact with the lip 24 of the register box. Spaced inwardly of the cover lip 36 and arranged concentrically therewith is a downwardly extending annular flange 38 which preferably has a slight outward taper. The tapered peripheral edge 26 of the crystal and the cover flange 38 are so related to each other in space that they coincide when the cover is closed.

Because of the tapered edge of the crystal 22, it will act as a cam when the cover is closed and it will stress the flange 38 into tight contact with it to form a good seal between the crystal and the cover. The sealing effect is enhanced if the flange 38 has some degree of flexibility such as is present in structures molded from thermoplastic molding compounds.

While the novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

We claim:
1. A water meter comprising:
   (a) a register box with a flat marginal surface at its upper end;
   (b) a register crystal of smaller horizontal dimensions than the marginal surface and concentric therewith, and having a portion projecting upwardly above said marginal surface, said projecting portion of the crystal having a tapered peripheral surface of upwardly decreasing diameter;
   (c) a cover for enclosing the crystal;
   (d) hinge means at one side of the cover pivotally connecting it to one external side of the register box;
   (e) latch means at the opposite external side of the cover for releasably connecting it to the opposite side of the register box;
wherein the improvement comprises:
   (f) said cover, being integral and of molded thermoplastic flexible material, and comprising:
      (1) an invertedly dished portion connecting said hinge means and said latch means and extending laterally sufficiently to cover said crystal;
      (2) a rim projecting downwardly from said dished portion and having a flat peripheral under surface engageable with the flat marginal surface at the top of the register box, said downwardly projecting rim and said inverted dished portion being dimensioned to provide substantial clearance between the projecting upper surface of the crystal and said dished portion;
      (3) a flange spaced inwardly from and concentric with said rim and projecting downwardly from said dished portion, said flange having an inner surface of downwardly increasing diameter and having a maximum unstressed diameter adjacent its lower edge smaller than the maximum diameter of the tapered periphery of the crystal, said inner surface being steeper than the tapered periphery of the crystal and adapted to engage that tapered periphery, said flange being vertically shorter than the rim so that when the cover is latched, the flat under surface of the rim engages the top of the box and the cylindrical flange engages the crystal at a locality above said marginal surface of the register box, and is expanded laterally and compressed locally, forming a tight seal of substantial width around the entire periphery of the crystal.

References Cited

UNITED STATES PATENTS

| | | | |
|---|---|---|---|
| 103,286 | 5/1870 | Bliss | 33—223 |
| 2,752,752 | 7/1956 | Simpson. | |
| 2,764,022 | 9/1956 | Hagne | 73—273 XR |
| 2,870,933 | 1/1959 | Winter | 220—24.3 |
| 3,067,612 | 12/1962 | Smith | 73—273 |

FOREIGN PATENTS

| | | |
|---|---|---|
| 1,100,958 | 4/1955 | France. |
| 1,461,486 | 11/1966 | France. |

JAMES J. GILL, Primary Examiner